United States Patent
Wu et al.

(10) Patent No.: US 10,673,686 B2
(45) Date of Patent: Jun. 2, 2020

(54) HIGH AVAILABILITY STORAGE POOL COMPOSE MECHANISM

(71) Applicant: QUANTA COMPUTER INC., Taoyuan (TW)

(72) Inventors: Feng-Kuang Wu, Taoyuan (TW); Ching-Chih Shih, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 0 days.

(21) Appl. No.: 15/801,904

(22) Filed: Nov. 2, 2017

(65) Prior Publication Data
US 2019/0052521 A1   Feb. 14, 2019

Related U.S. Application Data

(60) Provisional application No. 62/544,596, filed on Aug. 11, 2017.

(51) Int. Cl.
*H04L 12/24* (2006.01)
*G06F 3/06* (2006.01)
(Continued)

(52) U.S. Cl.
CPC ........ *H04L 41/0668* (2013.01); *G06F 3/0604* (2013.01); *G06F 3/067* (2013.01);
(Continued)

(58) Field of Classification Search
CPC ... H04L 41/0668; H04L 49/25; H04L 49/356; H04L 47/781; H04L 49/254
See application file for complete search history.

(56) References Cited

U.S. PATENT DOCUMENTS

| 7,774,642 B1 * | 8/2010 | Johnsen | H04L 41/065 |
| | | | 714/40 |
| 10,230,544 B1 * | 3/2019 | McDowell | H04L 12/4645 |

(Continued)

FOREIGN PATENT DOCUMENTS

| JP | 2003244192 A | 8/2003 |
| JP | 2007122698 A | 5/2007 |
| JP | 2011254293 A | 12/2011 |

OTHER PUBLICATIONS

Extended European Search Report for EP Application No. 18153186.4, dated Jul. 2, 2018.
(Continued)

*Primary Examiner* — Ian N Moore
*Assistant Examiner* — Rushil Parimal Sampat
(74) *Attorney, Agent, or Firm* — Nixon Peabody LLP; Zhou Lu (57) ABSTRACT

Systems and method for automatically composing resources with redundant fabric switches to support dual path HA storage access operation in a data center are provided. A data management module can be used to determine one or more drives in the data center that are connected to fabric switches. The fabric switches have a same chassis ID. The data management module can then associate the one or more drives to a first computer system via one fabric switch of the fabric switches, and associate the one or more to a second computer system via the other one fabric switch of the two fabric switches. In response to receiving a request from a specific user, the data management module can compose suitable resources of the data center to match the request based at least upon the one or more drives, the two switches, the first computer system, and the second computer system.

20 Claims, 6 Drawing Sheets

(51) Int. Cl.
*H04L 12/931* (2013.01)
*H04L 12/911* (2013.01)
*H04L 12/947* (2013.01)
*H04L 12/937* (2013.01)

(52) U.S. Cl.
CPC ........ *G06F 3/0629* (2013.01); *H04L 41/0893* (2013.01); *H04L 47/781* (2013.01); *H04L 49/25* (2013.01); *H04L 49/254* (2013.01); *H04L 49/356* (2013.01); *H04L 49/50* (2013.01); *G06F 3/0617* (2013.01)

(56) References Cited

U.S. PATENT DOCUMENTS

| | | |
|---|---|---|
| 2012/0033678 A1 | 2/2012 | Page et al. |
| 2013/0018753 A1 | 1/2013 | Waldrop et al. |
| 2013/0107713 A1 | 5/2013 | Campbell et al. |
| 2013/0151646 A1* | 6/2013 | Chidambaram .... H04L 47/6205 709/213 |
| 2017/0163569 A1* | 6/2017 | Koganti .................. H04L 49/25 |

OTHER PUBLICATIONS

TW Office Action for Application No. 106146192 dated Sep. 19, 2018, w/ First Office Action Summary.
TW Search Report for Application No. 106146192 dated Sep. 19, 2018, w/ First Office Action.
JP Office Action for Application No. 2018-032582, dated Nov. 27, 2018, w/ First Office Action Summary.
Okabe Ichijin, "Knowing the Limit" Always Fail "to Prepare for Disability" Nikkei Computer, No. 819, Oct. 11, 2012, pp. 70-75.
Okubo Shuichi, "Chapter 2 How is the cloud protected? Clustering in data center", Software Design, No. 287, Sep. 18, 2014, pp. 66-75.

* cited by examiner

FIG. 4

HIGH AVAILABILITY STORAGE POOL COMPOSE MECHANISM

CROSS-REFERENCE TO RELATED APPLICATIONS

This application claims priority to and the benefit of U.S. Provisional Patent Application No. 62/544,596, filed Aug. 11, 2017, the contents of which are hereby incorporated by reference in their entirety.

FIELD OF THE INVENTION

The present disclosure generally relates to server systems and more specifically, to network management.

BACKGROUND

Data center technology is becoming increasingly important in today's world. Not only are individual users utilizing their mobile devices and computers for entertainment and other needs, but corporations also depend on enterprise computing systems to carry out mission-critical tasks. All these applications and devices are supported mostly by data centers.

Data centers typically comprise three major components: servers, network, and storage devices. Further, data center management software is typically used to manage these components in the data centers. For example, data center management software receives requests from end users and then composes appropriate resources of the data center to service these requests. Composed resources may include computing capacity, memory and storage sizes, NIC (Network Interface Card) speed, and VLAN (Virtual Local Area Network) ID (Identification).

However, conventional data center management software, such as Intel® RSD (Rack Scale Design), only supports basic single path non-HA (High Availability) storage pool compose, and require further improvements to better support requests from corporations and end users.

SUMMARY

Systems and methods, in accordance with various examples of the present disclosure, provide a solution to the above-mentioned problems by automatically composing resources with redundant fabric switches to support dual path HA (High Availability) storage access operation in a data center. A data management software or module can be used to determine at least one drive in the data center that is connected to two fabric switches. The two fabric switches have a same chassis ID. The data management software or module can then associate the at least one drive to a first computer system via one fabric switch of the two fabric switches; and associate the at least one drive to a second computer system via the other one fabric switch of the two fabric switches. In response to receiving a request from a specific user, the data management software or module can compose suitable resources of the data center to match the request, based at least upon the at least one drive, the two fabric switches, the first computer system, and the second computer system. For purposes of the present detailed description, the word "compose" or "composing" means "searching" a matched resource (e.g., computer, storage, or network resources), and "allocating" the matched resource for the specific user. In some implementations, the matched resource may not be accessible for other users until the matched resource is "de-composed."

In accordance with one aspect of the present disclosure, a computer-implemented method for composing data center resources in a data center, comprises: (1) collecting a chassis ID (Identification) of each of a plurality of fabric switches in the data center; (2) determining a plurality of fabric switch pairs among the plurality of fabric switches in which each of the plurality of fabric switch pairs has a same chassis ID; (3) collecting connection status between the plurality of fabric switch pairs and a plurality of drives in the data center; (4) selecting at least one drive of the plurality of drives that is connected to both fabric switches of at least one fabric switch pair of the plurality of fabric switch pairs; (5) associating the at least one drive to a first computer system of the data center via one fabric switch of the at least one fabric switch pair; (6) associating the at least one drive to a second computer system of the data center via the other one fabric switch of the at least one fabric switch pair; (7) receiving a request from a user device of a user; and (8) composing resources of the data center to support the request based at least upon the at last one drive, the at least one fabric switch pair, the first computer system and the second computer system.

In some examples, two paired fabric switches are connected by Ethernet interfaces via an inter-link. Each fabric switch of the paired fabric switches has a unique MAC address. A chassis ID of each fabric switch of paired fabric switches is a combination of two MAC addresses of the paired fabric switches.

In some examples, the at least one drive is connected to both a first port of the one of the two paired fabric switches, and a second port of the other one of the two paired fabric switches. The first port and the second port have a same port number. In some implementations, each of the plurality of drives is only connected to one port of a fabric switch of the plurality of fabric switches. A same port number of two paired fabric switches is forced to map to a same drive.

In some examples, the chassis ID is a combination of at least a MAC (Media Access Control) address of an Ethernet interface of a corresponding fabric switch, or a UUID (Universally Unique Identifier).

In some examples, the computer-implemented method further comprises: causing the at least two paired fabric switches to exchange each other's UUIDs or MAC addresses; and associating the at least two paired fabric switches with an inter-link, the inter-link connecting the one fabric switch of the at least two paired fabric switches, to the other one fabric switch of the at least two paired fabric switches. The inter-link can be supported by Ethernet interfaces of the at least one pair of switches.

In some examples, the computer-implemented method further comprises: determining that the first computer system fails; and supporting the request based at least upon the other one fabric switch of the at least one fabric switch pair, and the second computer system.

In some examples, the computer-implemented method further comprises: determining that the one fabric switch of the at least one fabric switch pair fails; and supporting the request based at least upon the other one fabric switch of the at least one fabric switch pair, and second computer system.

In some examples, attributes of computer resources in the data center comprise, but are not limited to, core, speed and manufacture information of CPUs (Central Processing Units), and memory's size and speed. Attributes of storage resources in the data center comprise, but are not limited to, storage types (e.g., SAS (Serial Attached SCSI), SATA (Serial At Attachment), or NVMe (Non-Volatile Memory Express)) and storage size. Attributes of network resources in the data center comprise, but are not limited to, VLAN (Virtual Local Area Network), and network bandwidth/speed.

In accordance with another aspect of the present disclosure, a computer-implemented method for composing data center resources in a data center, comprises: (1) collecting a chassis ID of each of a plurality of fabric switches in the data center; (2) determining a plurality of fabric switch pairs among the plurality of fabric switches, in which each of the plurality of fabric switch pairs has a same chassis ID; (3) collecting connection status between the plurality of fabric switch pairs and a plurality of drives in the data center; (4) selecting at least one drive of the plurality of drives that is connected to both fabric switches of at least one fabric switch pair of the plurality of fabric switch pairs; (5) associating the at least one drive to a computer system of the data center via one fabric switch of the at least one fabric switch pair; (6) associating the at least one drive to the computer system via the other one fabric switch of the at least one fabric switch pair; (7) receiving a request from a user device of a user; and (8) composing resources of the data center to support the request based at least upon the at last one drive, the at least one fabric switch pair, and the computer system.

In some examples, the computer-implemented method further comprises: determining that the one of the at least one fabric switch pair fails; and supporting the request based at least upon the other one fabric switch of the at least one fabric switch pair, and the computer system.

In accordance with another aspect of the present disclosure, a non-transitory computer-readable storage medium storing instructions is provided. When the instructions are executed by a processor, they cause the processor to perform operations that include: (1) collecting a chassis ID of each of a plurality of fabric switches in the data center; (2) determining a plurality of fabric switch pairs among the plurality of fabric switches in which each of the plurality of fabric switch pairs has a same chassis ID; (3) collecting connection status between the plurality of fabric switch pairs and a plurality of drives in the data center; (4) selecting at least one drive of the plurality of drives that is connected to both fabric switches of at least one fabric switch pair of the plurality of fabric switch pairs; (5) associating the at least one drive to a first computer system of the data center via one fabric switch of the at least one fabric switch pair; (6) associating the at least one drive to a second computer system of the data center via the other one of the at least one fabric switch pair; (7) receiving a request from a user device of a user; and (8) composing resources of the data center to support the request based at least upon the at last one drive, the at least one fabric switch pair, the first computer system and the second computer system.

In accordance with another aspect of the present disclosure, a non-transitory computer-readable storage medium storing instructions is provided. When the instructions are executed by a processor, they cause the processor to perform operations that include: (1) collecting a chassis ID of each of a plurality of fabric switches in the data center; (2) determining a plurality of fabric switch pairs among the plurality of fabric switches, in which each of the plurality of fabric switch pairs has a same chassis ID; (3) collecting connection status between the plurality of fabric switch pairs and a plurality of drives in the data center; (4) selecting at least one drive of the plurality of drives that is connected to both fabric switches of at least one fabric switch pair of the plurality of fabric switch pairs; (5) associating the at least one drive to a computer system of the data center via one fabric switch of the at least one fabric switch pair; (6) associating the at least one drive to the computer system via the other one fabric switch of the at least one fabric switch pair; (7) receiving a request from a user device of a user; and (8) composing resources of the data center to support the request based at least upon the at last one drive, the at least one fabric switch pair, and the computer system.

Additional features and advantages of the disclosure will be set forth in the description which follows, and in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof, which are illustrated in the appended drawings. These drawings depict only example aspects of the disclosure and are not therefore to be considered to be limiting of its scope. The principles herein are described and explained with additional specificity and detail through the use of the accompanying drawings in which.

DETAILED DESCRIPTION

The present disclosure can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed: the singular includes the plural and vice versa; and the word "including" means "including without limitation." Moreover, words of approximation, such as "about," "almost," "substantially," "approximately," and the like, can be used herein to mean "at, near, or nearly at," or "within 3-5% of,"

or "within acceptable manufacturing tolerances," or any logical combination thereof, for example.

Various examples of the present disclosure provide methods for automatically composing resources with redundant fabric switches to support dual path HA storage access operation in a data center. A data management software or module can be used to determine at least one drive in the data center that is connected to a pair of two fabric switches. The two fabric switches have a same chassis ID. The data management software or module can then associate the at least one drive to a first computer system via one fabric switch of the two fabric switches, and associate the at least one drive to a second computer system via the other one fabric switch of the two fabric switches. In response to receiving a request from a specific user, the data management software or module can compose suitable resources of the data center to match the request based at least upon the at last one drive, the two fabric switches, the first computer system, and the second computer system.

Figure 1A:
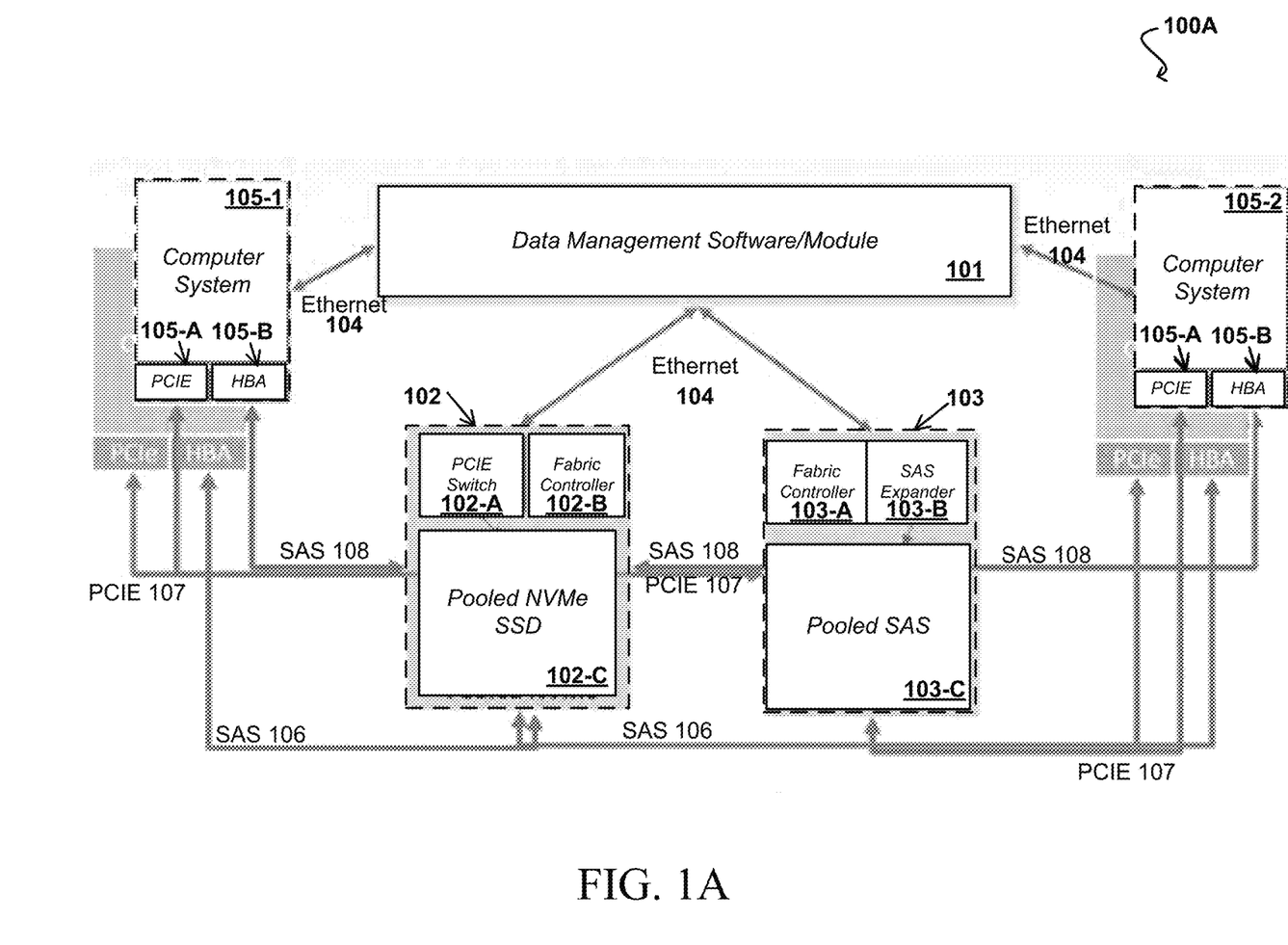
FIG. 1A is schematic block diagram illustrating an exemplary data center capable of composing suitable resources in response to a user request, in accordance with some implementations of the present disclosure.

FIG. 1A is schematic block diagram illustrating an exemplary data center 100A capable of composing suitable resources in response to a user request, in accordance with some implementations of the present disclosure. In this example, the data center 100A includes a data management software or module 101, a plurality of drives (e.g., 102-C and 103-C), a plurality of fabric switches (e.g., 102-B and 103-B), and a plurality of computer systems (e.g., 105-1 and 105-2). The plurality of drives can comprises a plurality of SSDs (Solid State Drives) 102-C and a plurality of hard drives 103-C. In some examples, the plurality of SSDs 102-C can be NVMe (Non-Volatile Memory Express) SSDs. The plurality of hard drives 103-C can be SCSI (Small Computer System Interface) drives, SAS (Serial Attached SCSI) drives, ATA (At Attachment) drives, SATA (Serial ATA) drives, or any dual port hard drives or SSDs (e.g., dual port SAS drives, dual port NVMe (Non-Volatile Memory Express) drives or NVMe drives with SRIOV (Single Root Input/Output Virtualization) or MRIOV (Multi-Root Input/Output Virtualization) support).

In this example, the data management software or module 101 communicates with the plurality of fabric switches (e.g., 102-B and 103-B) and the plurality of computer systems (e.g., 105-1 and 105-2) via Ethernet connections 104. The data management software or module 101 communicates with the plurality of drives (e.g., 102-C and 103-C) via a corresponding drive switch. For example, the data management software or module 101 communicates with SSDs 102-C via a PCIE switch 102-A, and communicates with SAS drives 103-C via a SAS expander 103-B.

In FIG. 1A, each of the plurality of computer systems (e.g., 105-1 and 105-2) comprises a HBA (Host Bus Adapter) 105-B and a PCIE (Peripheral Component Interconnect Express) interface 105-A. The HBA 105-B is configured to act as a host system, and connect a corresponding computer system to one or more hard drives (e.g., SAS drives 103-C) via a SAS connection 108. The PCIE interface 105-A is configured to connect a corresponding computer system to the SSD 102-C via a PCIE connection 107, and may support I/O virtualization. In some examples, the plurality of drives (e.g., 102-C and 103-C) in the data center 100A can also be coupled with each other via the PCIE connection 107 or the SAS connection 108.

Figure 1B:
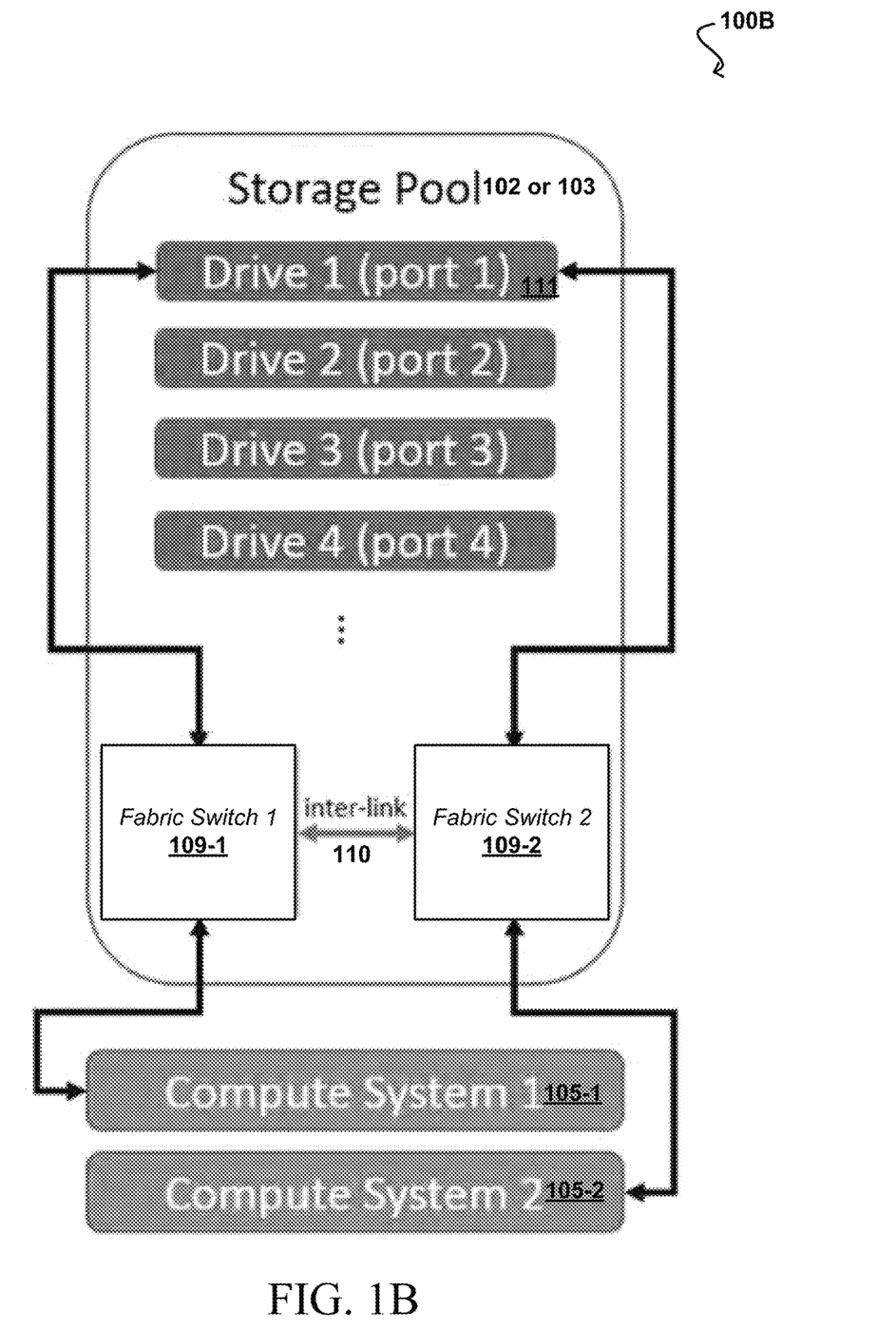
FIGS. 1B and 1C are schematic block diagrams illustrating exemplary architectures between a storage pool, fabric switches, and computer systems in a data center as illustrated in FIG. 1A, in accordance with some implementations of the present disclosure.

FIG. 1B is a schematic block diagrams illustrating an exemplary architecture 100B between a storage pool, fabric switches, and computer systems in a data center, as illustrated in FIG. 1A, in accordance with some implementations of the present disclosure. In this example, a data management software or module can determine at least two fabric switches (e.g., fabric switch 1 109-1 and fabric switch 2 109-2) that have a same chassis ID. The chassis ID is a combination of at least a MAC address of an Ethernet interface of the fabric switch 1 109-1 or fabric switch 2 109-2. In this example, the fabric switch 1 109-1 and the fabric switch 2 109-2 are interconnected via an inter-link interface. In some implementations, the inter-link interface is an Ethernet interface.

Port 1 of a Drive 1 111 of the storage pool (e.g., 102 or 103) is connected to both of the fabric switch 1 109-1 and the fabric switch 2 109-2 via two separate interfaces. In some examples, the two separate interfaces are SAS interfaces, PCIe interfaces, or other types of hard drive interfaces.

The fabric switch 1 109-1 is connected to a computer system 1 105-1 via a SAS interface, while the fabric switch 2 109-2 is connected to a computer system 2 105-2 via another SAS interface. In FIG. 1B's topology, the Drive 1 111 is associated with two separate fabric switch-computer system pairs (e.g., fabric switch 1 109-1/computer system 1 105-1, and fabric switch 2 109-2/computer system 105-2). In response to receiving a request from a specific user, the data management software or module can composing resources of the data center 100B to support the request based at least upon the Drive 1 111, the fabric switch 1 109-1, the fabric switch 2 109-2, the computer system 1 105-1, and the computer system 2 105-2.

Thus, even if one of the fabric switch 1 109-1 and the fabric switch 2 109-2 fails, the other one of the fabric switch 1 109-1 and the fabric switch 2 109-2 can take over to support active-passive redundancy. Similarly, even if one of the computer system 1 105-1 and the computer system 2 105-2 fails, the other one of the computer system 1 105-1 and the computer system 2 105-2 can take over.

Figure 1C:
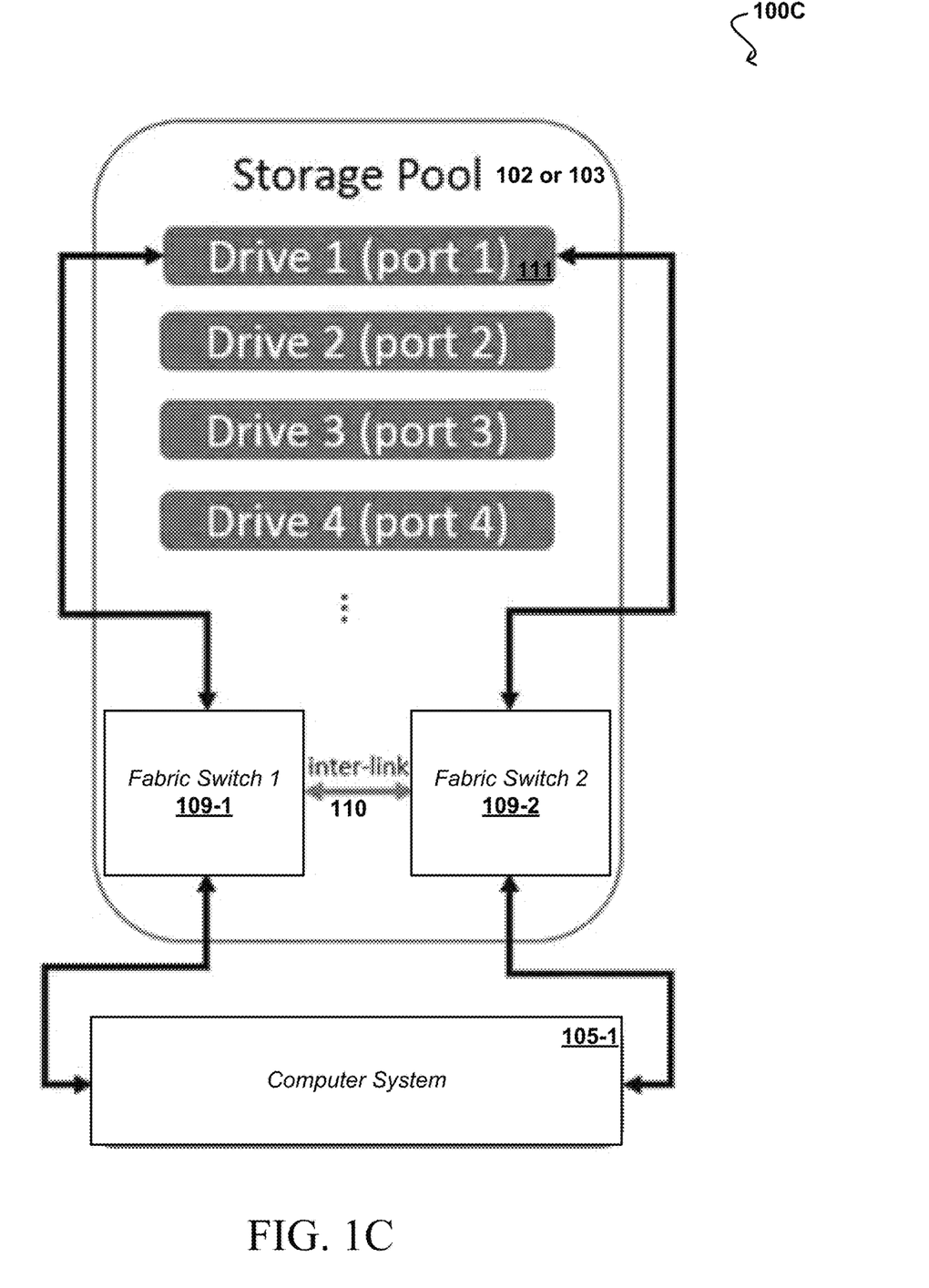

FIG. 1C is a schematic block diagrams illustrating another exemplary architecture 100C between a storage pool, fabric switches, and computer systems in a data center, as illustrated in FIG. 1A, in accordance with some implementations of the present disclosure. In this example, a data management software or module can determine at least two fabric switches (e.g., fabric switch 1 109-1 and fabric switch 2 109-2) that have a same chassis ID. In this example, the fabric switch 1 109-1 and the fabric switch 2 109-2 are interconnected via an inter-link interface (e.g., an Ethernet interface).

Port 1 of a Drive 1 111 of the storage pool (e.g., 102 or 103) is connected to both the fabric switch 1 109-1 and the fabric switch 2 109-2, via two separate interfaces (e.g., SAS interfaces). Both the fabric switch 1 109-1 and the fabric switch 2 109-2 are connected to a computer system 1 105-1 via SAS interfaces.

In FIG. 1C's topology, the Drive 1 111 is connected with the computer system 105-1 via two separate fabric switches: the fabric switch 1 109-1 and the fabric switch 2 109-2. Thus, even if one of the fabric switch 1 109-1 and the fabric switch 2 109-2 fails, the other one of the fabric switch 1 109-1 and the fabric switch 2 109-2 can take over to support active-passive redundancy.

In response to receiving a request from a specific user, the data management software or module can compose resources of the data center 100B to support the request based at least upon the Drive 1 111, the fabric switch 1 109-1, the fabric switch 2 109-2, and the computer system 1 105-1.

Although only certain components are shown within the exemplary systems 100A-100C in FIGS. 1A-1C, various types of electronic or computing components that are capable of processing or storing data, receiving or transmitting signals, or providing fresh air to downstream components, can also be included in the exemplary systems 100A-100C. Further, the electronic or computing components in the exemplary systems 100A-100C can be configured to execute various types of applications, and/or can use various types of operating systems. These operating systems can include, but are not limited to, Android, BSD (Berkeley Software Distribution), iOS (iPhone OS), Linux, OS X, Unix-like Real-time Operating System (e.g., QNX), Microsoft Windows, Window Phone, and IBM z/OS.

Depending on the desired implementation for the exemplary systems 100A-100C, a variety of networking and messaging protocols can be used, including but not limited to, TCP/IP, OSI (open systems interconnection), FTP (file transfer protocol), UPnP (universal plug and play), NFS (network file system), CIFS (common internet file system), AppleTalk etc. As would be appreciated by those skilled in the art, the exemplary systems 100A-100C illustrated in FIGS. 1A-1C are used for purposes of explanation. Therefore, a network system can be implemented with many variations, as appropriate, yet still provide a configuration of network platform in accordance with various examples of the present disclosure.

In exemplary configurations of FIGS. 1A-1C, the exemplary systems 100A-100C can also include one or more wireless components that are operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well, within the scope of various examples.

The above discussion is meant to be illustrative of the principles and various examples of the present disclosure. Numerous variations and modifications will become apparent once the above disclosure is fully appreciated.

Figure 2A:
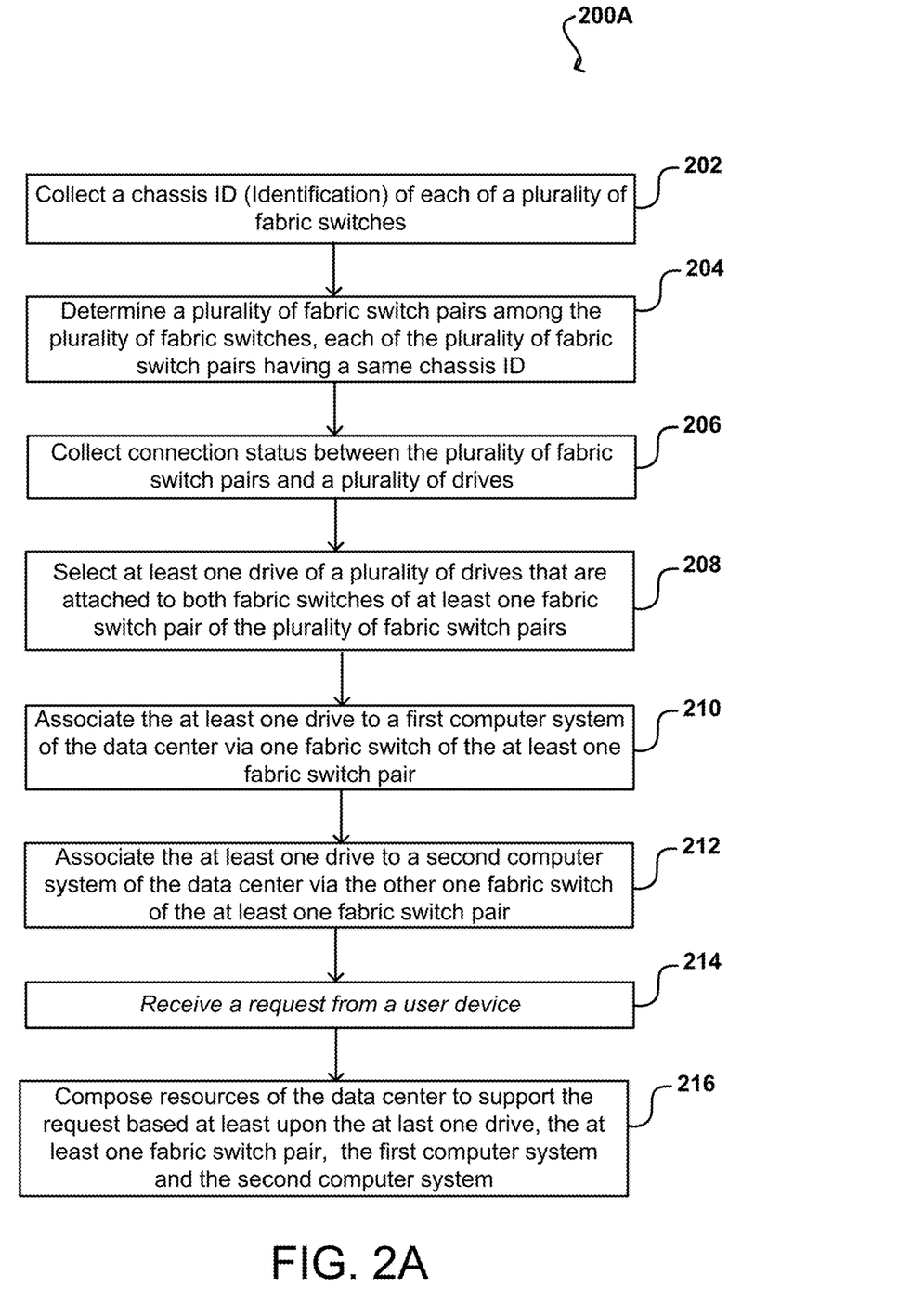
FIGS. 2A-2B are exemplary methods for automatically composing data center resources in a data center, in accordance with an implementation of the present disclosure.

FIG. 2A is an exemplary method 200A for automatically composing data center resources in a data center using a data management software or module, in accordance with an implementation of the present disclosure. It should be understood that the exemplary method 200A is presented solely for illustrative purposes, and that other methods in accordance with the present disclosure, can include additional, fewer, or alternative steps performed in similar or alternative orders, or in parallel. The exemplary method 200A starts at step 202 by collecting a chassis ID (Identification) of each of a plurality of fabric switches in the data center. In some examples, the chassis ID is a combination of at least a MAC (Media Access Control) address of an Ethernet interface of a corresponding fabric switch or a UUID (Universally Unique Identifier).

At step 204, the data management software or module can determine a plurality of fabric switch pairs among the plurality of fabric switches, as illustrated in FIG. 1B. Each of the plurality of fabric switch pairs has a same chassis ID. At step 206, the data management software or module can collect connection status between the plurality of fabric switch pairs and a plurality of drives in the data center, as illustrated in FIGS. 1A and 1B. At step 208, the data management software or module can select at least one drive of the plurality of drives that is connected to both fabric switches of at least one fabric switch pair of the plurality of fabric switch pairs, as illustrated in FIGS. 1A and 1B. At step 210, the data management software or module can associate the at least one drive to a first computer system of the data center via one fabric switch of the at least one fabric switch pair, as illustrated in FIGS. 1A and 1B. At step 212, the data management software or module can associate the at least one drive to a second computer system of the data center via the other one fabric switch of the at least one fabric switch pair, as illustrated in FIGS. 1A and 1B.

At step 214, the data management software or module can receive a request from a user device. In response to receiving the request, the data management software or module can compose resources of the data center to support the request based at least upon the at last one drive, the at least one fabric switch pair, the first computer system, and the second computer system.

In some examples, the computer-implemented method 200A further comprises: determining that the first computer system fails; and supporting the request based at least upon the other one fabric switch of the at least one fabric switch pair, and the second computer system.

In some other examples, the computer-implemented method 200A further comprises: determining that the one fabric switch of the at least one fabric switch pair fails; and supporting the request based at least upon the other one fabric switch of the at least one fabric switch pair, and second computer system.

Figure 2B:
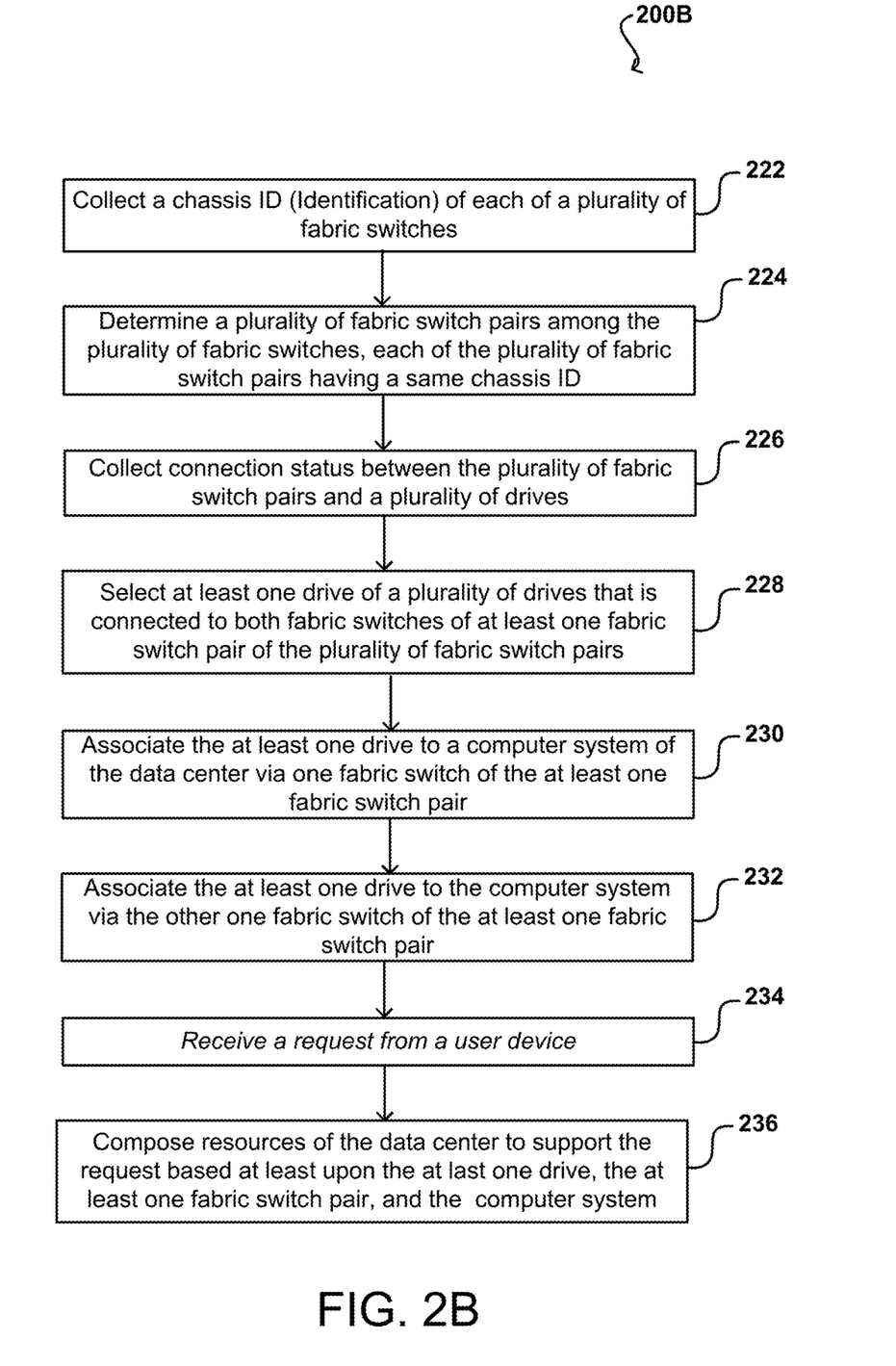

FIG. 2B is another exemplary method 200B for automatically composing data center resources in a data center using a data management software or module, in accordance with an implementation of the present disclosure. The exemplary method 200B starts at step 222 by collecting a chassis ID (Identification) of each of a plurality of fabric switches in the data center.

At step 224, the data management software or module can determine a plurality of fabric switch pairs among the plurality of fabric switches, as illustrated in FIG. 1C. Each of the plurality of fabric switch pairs has a same chassis ID. At step 226, the data management software or module can collect connection status between the plurality of fabric switch pairs and a plurality of drives in the data center, as illustrated in FIGS. 1A and 1C.

At step 228, the data management software or module can select at least one drive of the plurality of drives that is connected to both fabric switches of at least one fabric switch pair of the plurality of fabric switch pairs, as illustrated in FIGS. 1A and 1C. At step 230, the data management software or module can associate the at least one drive to a computer system of the data center via one fabric switch of the at least one fabric switch pair, as illustrated in FIGS. 1A and 1C. At step 232, the data management software or module can associate the at least one drive to the computer system of the data center via the other one fabric switch of the at least one fabric switch pair, as illustrated in FIGS. 1A and 1C.

At step 234, the data management software or module can receive a request from a user device of a user. In response to receiving the request, the data management software or module can compose resources of the data center to support the request based at least upon the at last one drive, the at least one fabric switch pair, and the computer system.

In some examples, the computer-implemented method 200B further comprises: determining that the one fabric switch of the at least one fabric switch pair fails; and supporting the request based at least upon the other one fabric switch of the at least one fabric switch pair.

Figure 3:
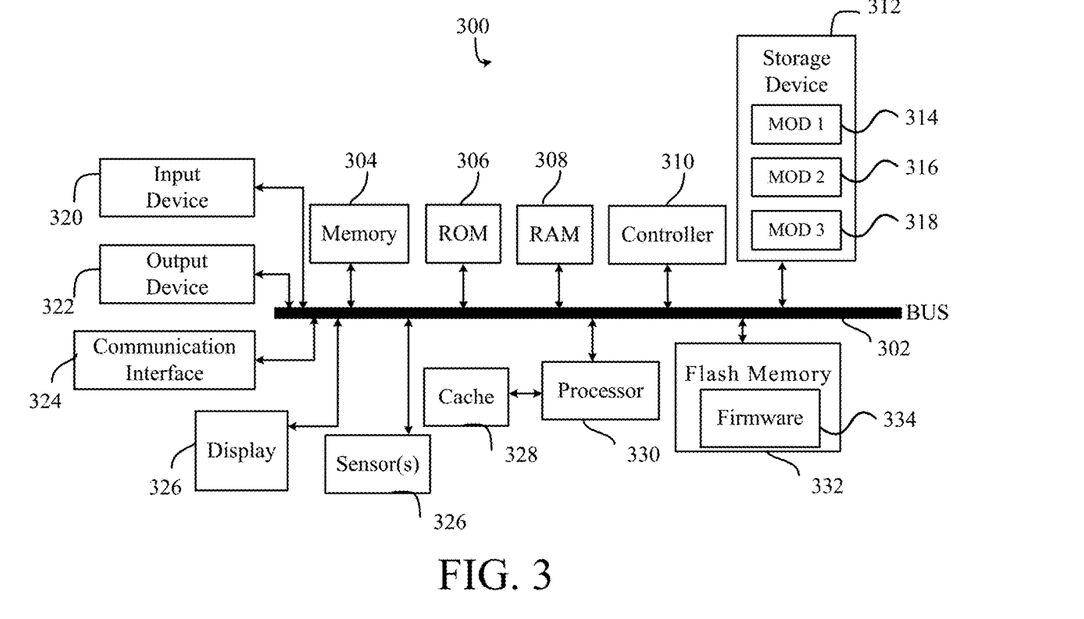
FIGS. 3 and 4 illustrate exemplary systems in accordance with various examples of the present disclosure.
Figure 4:
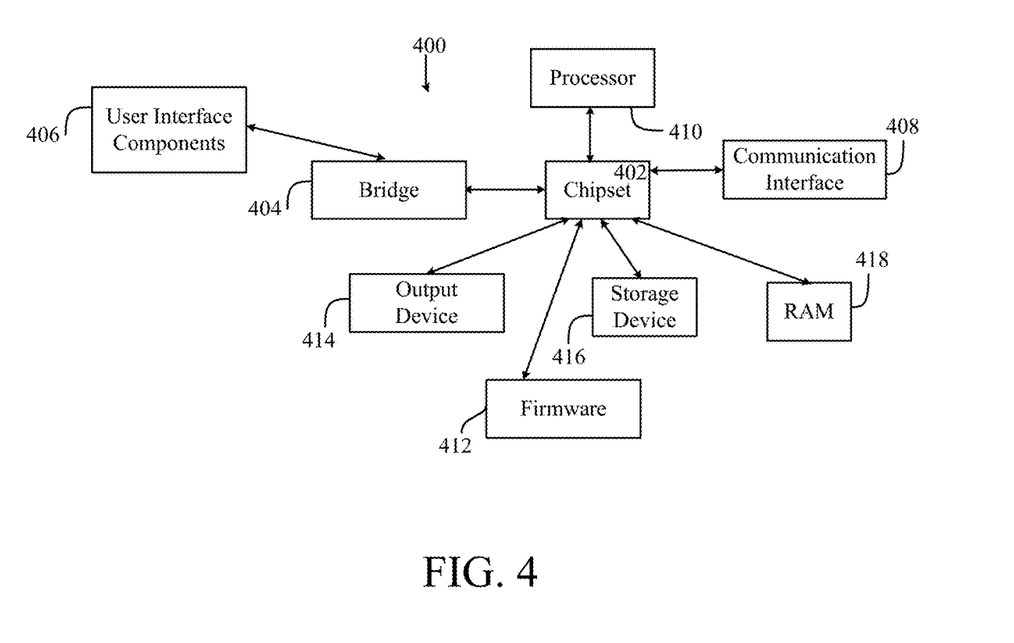

A brief introductory description of example systems and networks, as illustrated in FIGS. 3-4, is disclosed herein. These variations shall be described herein as the various examples are set forth. The present disclosure now turns to FIG. 3.

FIG. 3 illustrates an example computing system 300, in which components of the computing system are in electrical communication with each other using a bus 302. The system 300 includes a processing unit (CPU or processor) 330, and a system bus 302 that couples various system components, including the system memory 304 (e.g., read only memory (ROM) 306 and random access memory (RAM) 308), to the processor 330. The system 300 can include a cache of high-speed memory connected directly with, in close proximity to, or integrated as part of the processor 330. The system 300 can copy data from the memory 304 and/or the storage device 312 to the cache 328 for quick access by the processor 330. In this way, the cache can provide a performance boost for processor 330 while waiting for data. These and other modules can control or be configured to control the processor 330 to perform various actions. Other system memory 304 may be available for use as well. The memory 304 can include multiple different types of memory with different performance characteristics. The processor 330 can include any general purpose processor and a hardware module or software module, such as module 1 314, module 2 316, and module 3 318 embedded in storage device 312. The hardware module or software module is configured to control the processor 330, as well as a special-purpose processor where software instructions are incorporated into the actual processor design. The processor 330 may essentially be a completely self-contained computing system, containing multiple cores or processors, a bus, memory controller, cache, etc. A multi-core processor may be symmetric or asymmetric.

To enable user interaction with the computing device 300, an input device 320 is provided as an input mechanism. The input device 320 can comprise a microphone for speech, a touch-sensitive screen for gesture or graphical input, keyboard, mouse, motion input, and so forth. In some instances, multimodal systems can enable a user to provide multiple types of input to communicate with the system 300. In this example, an output device 322 is also provided. The communications interface 324 can govern and manage the user input and system output.

Storage device 312 can be a non-volatile memory to store data that are accessible by a computer. The storage device 312 can be magnetic cassettes, flash memory cards, solid state memory devices, digital versatile disks, cartridges, random access memories (RAMs) 308, read only memory (ROM) 306, and hybrids thereof.

The controller 310 can be a specialized microcontroller or processor on the system 300, such as a BMC (baseboard management controller). In some cases, the controller 310 can be part of an Intelligent Platform Management Interface (IPMI). Moreover, in some cases, the controller 310 can be embedded on a motherboard or main circuit board of the system 300. The controller 310 can manage the interface between system management software and platform hardware. The controller 310 can also communicate with various system devices and components (internal and/or external), such as controllers or peripheral components, as further described below.

The controller 310 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 310 to initiate or conduct specific hardware recovery procedures or operations, as further described below.

The controller 310 can also include a system event log controller and/or storage for managing and maintaining events, alerts, and notifications received by the controller 310. For example, the controller 310 or a system event log controller can receive alerts or notifications from one or more devices and components, and maintain the alerts or notifications in a system event log storage component.

Flash memory 332 can be an electronic non-volatile computer storage medium or chip that can be used by the system 300 for storage and/or data transfer. The flash memory 332 can be electrically erased and/or reprogrammed. Flash memory 332 can include EPROM (erasable programmable read-only memory), EEPROM (electrically erasable programmable read-only memory), ROM, NVRAM, or CMOS (complementary metal-oxide semiconductor), for example. The flash memory 332 can store the firmware 334 executed by the system 300 when the system 300 is first powered on, along with a set of configurations specified for the firmware 334. The flash memory 332 can also store configurations used by the firmware 334.

The firmware 334 can include a Basic Input/Output System or equivalents, such as an EFI (Extensible Firmware Interface) or UEFI (Unified Extensible Firmware Interface). The firmware 334 can be loaded and executed as a sequence program each time the system 300 is started. The firmware 334 can recognize, initialize, and test hardware present in the system 300 based on the set of configurations. The firmware 334 can perform a self-test, such as a POST (Power-on-Self-Test), on the system 300. This self-test can test the functionality of various hardware components such as hard disk drives, optical reading devices, cooling devices, memory modules, expansion cards, and the like. The firmware 334 can address and allocate an area in the memory 304, ROM 306, RAM 308, and/or storage device 312, to store an operating system (OS). The firmware 334 can load a boot loader and/or OS, and give control of the system 300 to the OS.

The firmware 334 of the system 300 can include a firmware configuration that defines how the firmware 334 controls various hardware components in the system 300. The firmware configuration can determine the order in which the various hardware components in the system 300 are started. The firmware 334 can provide an interface, such as an UEFI, that allows a variety of different parameters to be set, which can be different from parameters in a firmware default configuration. For example, a user (e.g., an administrator) can use the firmware 334 to specify clock and bus speeds; define what peripherals are attached to the system 300; set monitoring of health (e.g., fan speeds and CPU temperature limits); and/or provide a variety of other parameters that affect overall performance and power usage of the system 300. While firmware 334 is illustrated as being stored in the flash memory 332, one of ordinary skill in the art will readily recognize that the firmware 334 can be stored in other memory components, such as memory 304 or ROM 306.

System 300 can include one or more sensors 326. The one or more sensors 326 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 326 can communicate with the processor, cache 328, flash memory 332, communications interface 324, memory 304, ROM 306, RAM 308, controller 310, and storage device 312, via the bus 302, for example. The one or more sensors 326 can also communicate with other components in the system via one or more different means, such as inter-integrated circuit (I2C), general purpose output (GPO), and the like. Different types of sensors (e.g., sensors 326) on the system 300 can also report to the controller 310 on parameters, such as cooling fan speeds, power status, operating system (OS) status, hardware status, and so forth.

FIG. 4 illustrates an example computer system 400 having a chipset architecture that can be used in executing the described method(s) or operations, and generating and displaying a graphical user interface (GUI). Computer system 400 can include computer hardware, software, and firmware that can be used to implement the disclosed technology. System 400 can include a processor 410, representative of a variety of physically and/or logically distinct resources capable of executing software, firmware, and hardware configured to perform identified computations. Processor 410 can communicate with a chipset 402 that can control input to and output from processor 410. In this example, chipset 402 outputs information to output device 414, such as a display, and can read and write information to storage device 416. The storage device 416 can include magnetic media, and solid state media, for example. Chipset 402 can also read data from and write data to RAM 418. A bridge 404 for interfacing with a variety of user interface components 406, can be provided for interfacing with chipset 402. User interface components 406 can include a keyboard, a microphone, touch detection and processing circuitry, and a pointing device, such as a mouse.

Chipset 402 can also interface with one or more communication interfaces 408 that can have different physical interfaces. Such communication interfaces can include interfaces for wired and wireless local area networks, for broadband wireless networks, and for personal area networks. Further, the machine can receive inputs from a user via user interface components 406, and execute appropriate functions, such as browsing functions by interpreting these inputs using processor 410.

Moreover, chipset 402 can also communicate with firmware 412, which can be executed by the computer system 400 when powering on. The firmware 412 can recognize, initialize, and test hardware present in the computer system 400 based on a set of firmware configurations. The firmware 412 can perform a self-test, such as a POST, on the system 400. The self-test can test the functionality of the various hardware components 402-418. The firmware 412 can address and allocate an area in the memory 418 to store an OS. The firmware 412 can load a boot loader and/or OS, and give control of the system 400 to the OS. In some cases, the firmware 412 can communicate with the hardware components 402-410 and 414-418. Here, the firmware 412 can communicate with the hardware components 402-410 and 414-418 through the chipset 402, and/or through one or more other components. In some cases, the firmware 412 can communicate directly with the hardware components 402-410 and 414-418.

It can be appreciated that example systems 300 and 400 can have more than one processor (e.g., 330, 410), or be part of a group or cluster of computing devices networked together to provide greater processing capability.

For clarity of explanation, in some instances, the present disclosure may be presented as including individual functional blocks, including functional blocks, devices, and/or device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources that are used can be accessible over a network. The computer executable instructions may be, for example, binaries and intermediate format instructions, such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips, or different processes executed in a single device, by way of further example.

The various examples can be further implemented in a wide variety of operating environments, which in some cases can include one or more server computers, user computers, or computing devices which can be used to operate any of a number of applications. User or client devices can include any of a number of general purpose personal computers, such as desktop or laptop computers running a standard operating system, as well as cellular, wireless, and handheld devices running mobile software, and capable of supporting a number of networking and messaging protocols. Such a system can also include a number of workstations running any of a variety of commercially-available operating systems, and other known applications for purposes such as development and database management. These devices can also include other electronic devices, such as dummy terminals, thin-clients, gaming systems, and other devices capable of communicating via a network.

To the extent examples, or portions thereof, are implemented in hardware, the present disclosure can be implemented with one, or a combination, of the following technologies: a discrete logic circuit(s) having logic gates for implementing logic functions upon data signals; an application specific integrated circuit (ASIC) having appropriate combinational logic gates; programmable hardware such as a programmable gate array(s) (PGA); a field programmable gate array (FPGA); etc.

Most examples utilize at least one network that would be familiar to those skilled in the art for supporting communications using a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network, and any combination thereof.

Devices implementing methods, according to these technologies, can include hardware, firmware and/or software, and can take a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips, or different processes executing in a single device, by way of further example.

In examples that utilize a Web server, the Web server can run a variety of server or mid-tier applications, including HTTP servers, FTP servers, CGI servers, data servers, Java servers, and business application servers. In response to requests from user devices, the Web server(s) can also be capable of executing programs or scripts. For example, the Web server can execute one or more Web applications, which can be implemented as one or more scripts or programs written in any programming language, such as Java®, C, C # or C++ or any scripting language, such as Perl, Python or TCL, as well as combinations thereof. The Web server(s) can also encompass database servers, including those commercially available on the open market.

The server system can include a variety of data stores and other memory and storage media, as discussed above. These can reside in a variety of locations, such as on a storage medium local to (and/or resident in) one or more of the computers, or remote from the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad), and at least one output device (e.g., a display device, printer or speaker). Such a system can also include one or more storage devices, such as disk drives, optical storage devices, and solid-state storage devices such as random access memory (RAM) or read-only memory (ROM), as well as removable media devices, memory cards, flash cards, etc.

Storage media and computer readable media for containing code, or portions of code, can include any appropriate media known or used in the art, including storage media and computing media. The storage media and computing media can include, but are not limited to, removable and non-removable media for storage and/or transmission of data or information. The removable and non-removable media comprise RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices. The removable and non-removable media can be used to store the desired information that can be accessed by a system device. The data or information can include computer readable instructions, data structures, program modules, or other data. Based on the technology and teachings provided herein, a person of ordinary skill in the art will appreciate other ways and/or methods to implement the various aspects of the present disclosure.

The specification and drawings are, accordingly, to be regarded in an illustrative rather than a restrictive sense. It will, however, be evident that various modifications and changes can be made thereunto without departing from the broader spirit and scope of the patent application, as set forth in the claims.

What is claimed is:

1. A computer-implemented method for automatically composing data center resources in a data center, comprising:
    collecting a chassis ID (Identification) of each of a plurality of fabric switches in the data center;
    determining a fabric switch pair among the plurality of fabric switches using the collected chassis ID, wherein determining the fabric switch pair comprises identifying a first fabric switch and a second fabric that share a same chassis ID;
    collecting connection status between the fabric switch pair and a plurality of drives in the data center;
    selecting at least one drive of the plurality of drives that is connected to both fabric switches of the fabric switch pair, wherein each of the at least one drive is connected to the first fabric switch by a first interface and connected to the second fabric switch by a second interface;
    associating the at least one drive to a first computer system of the data center via the first fabric switch of the fabric switch pair, the first fabric switch of the fabric switch pair being directly connected to the first computer system;
    associating the at least one drive to a second computer system of the data center via the second fabric switch of the fabric switch pair, the second fabric switch of the fabric switch pair being directly connected to the second computer system;
    receiving a request from a user device of a user;
    composing resources of the data center to support the request based at least upon the at least one drive, the fabric switch pair, the first computer system, and the second computer system;
    associating the fabric switch pair with an inter-link, the inter-link connecting the first fabric switch of the fabric switch pair to the second fabric switch of the fabric switch pair;
    determining failure of at least one of the first fabric switch, the first computer system, the second fabric switch, and the second computer system;
    when the first fabric switch or the first computer system fails, supporting the request based at least upon the second fabric switch of the fabric switch pair and the second computer system; and
    when the second fabric switch or the second computer system fails, supporting the request based at least upon the first fabric switch and the first computer system.

2. The computer-implemented method of claim 1, wherein the at least one drive is connected to a first port of the first fabric switch of the fabric switch pair using a first Serial Attached SCSI (SAS) interface or a first Peripheral Component Interconnect Express (PCIe) interface, and wherein the at least one drive is connected to a second port of the second fabric switch of the fabric switch pair using a second Serial Attached SCSI (SAS) interface or a second Peripheral Component Interconnect Express (PCIe) interface, the first port and the second port having a same port number.

3. The computer-implemented method of claim 1, wherein the chassis ID is a combination of at least a MAC (Media Access Control) address, or a UUID (Universally Unique Identifier) of an Ethernet interface of a corresponding fabric switch.

4. The computer-implemented method of claim 3, further comprising:
 causing each fabric switch of the fabric switch pair to exchange each other's UUIDs or MAC addresses; and
 associating the fabric switch pair with an inter-link, the inter-link connecting the first fabric switch of the fabric switch pair to the second fabric switch of the fabric switch pair.

5. The computer-implemented method of claim 4, wherein the inter-link is supported by Ethernet interfaces of the fabric switch pair.

6. The computer-implemented method of claim 1, further comprising:
 determining that the first computer system fails or the first fabric switch fails; and
 supporting the request based at least upon the second fabric switch of the fabric switch pair, and the second computer system.

7. A computer-implemented method for automatically composing data center resources in a data center, comprising:
 collecting a chassis ID (Identification) of each of a plurality of fabric switches in the data center;
 determining a fabric switch pair among the plurality of fabric switches using the collected chassis ID, wherein determining the fabric switch pair comprises identifying a first fabric switch and a second fabric that share a same chassis ID;
 collecting connection status between the fabric switch pair and a plurality of drives in the data center;
 selecting at least one drive of the plurality of drives that is connected to both fabric switches of the fabric switch pair, wherein each of the at least one drive is connected to the first fabric switch by a first interface and connected to the second fabric switch by a second interface;
 associating the at least one drive to a computer system of the data center via the first fabric switch of the fabric switch pair, the first fabric switch of the fabric switch pair being directly connected to the computer system;
 associating the at least one drive to the computer system of the data center via the second fabric switch of the fabric switch pair, the second fabric switch of the fabric switch pair being directly connected to the computer system;
 receiving a request from a user device of a user;
 composing resources of the data center to support the request based at least upon the at least one drive, the fabric switch pair, and the computer system;
 associating the fabric switch pair with an inter-link, the inter-link connecting the first fabric switch of the fabric switch pair to the second fabric switch of the fabric switch pair;
 determining failure of at least one of the first fabric switch, the first computer system, the second fabric switch, and the second computer system;
 when the first fabric switch or the first computer system fails, supporting the request based at least upon the second fabric switch of the fabric switch pair and the second computer system; and
 when the second fabric switch or the second computer system fails, supporting the request based at least upon the first fabric switch and the first computer system.

8. The computer-implemented method of claim 7, wherein the at least one drive is connected to a first port of the first fabric switch of the fabric switch pair using a first Serial Attached SCSI (SAS) interface or a first Peripheral Component Interconnect Express (PCIe) interface, and wherein the at least one drive is connected to a second port of the second fabric switch of the fabric switch pair using a second Serial Attached SCSI (SAS) interface or a second Peripheral Component Interconnect Express (PCIe) interface, the first port and the second port having a same port number.

9. The computer-implemented method of claim 8, wherein the chassis ID is a combination of at least a MAC (Media Access Control) address, or a UUID (Universally Unique Identifier) of an Ethernet interface of a corresponding fabric switch.

10. The computer-implemented method of claim 9, further comprising:
 causing each fabric switch of the fabric switch pair to exchange each other's UUIDs or MAC addresses; and
 associating the fabric switch pair with an inter-link, the inter-link connecting the first fabric switch of the fabric switch pair to the second fabric switch of the fabric switch pair.

11. The computer-implemented method of claim 10, wherein the inter-link is supported by Ethernet interfaces of the fabric switch pair.

12. The computer-implemented method of claim 10, further comprising:
 determining that the first fabric switch of the fabric switch pair fails; and
 supporting the request based at least upon the second fabric switch of the fabric switch pair, and the computer system.

13. A system for automatically composing data center resources in a data center, comprising:
 a processor; and
 a computer-readable medium storing instructions that, when executed by the processor, cause the system to perform operations comprising:
  collecting a chassis ID (Identification) of each of a plurality of fabric switches in the data center;
  determining a fabric switch pair among the plurality of fabric switches using the collected chassis ID, wherein determining the fabric switch pair comprises identifying a first fabric switch and a second fabric that share a same chassis ID;
  collecting connection status between the fabric switch pair and a plurality of drives in the data center;
  selecting at least one drive of the plurality of drives that is connected to both fabric switches of the fabric switch pair, wherein each of the at least one drive is connected to the first fabric switch by a first interface and connected to the second fabric switch by a second interface;
  associating the at least one drive to a first computer system of the data center via the first fabric switch of the fabric switch pair, the first fabric switch of the fabric switch pair being directly connected to the first computer system;
  associating the at least one drive to a second computer system of the data center via the second fabric switch of the fabric switch pair, the second fabric switch of the fabric switch pair being directly connected to the second computer system;
  receiving a request from a user device of a user;
  composing resources of the data center to support the request based at least upon the at least one drive, the fabric switch pair, the first computer system, and the second computer system;

associating the fabric switch pair with an inter-link, the inter-link connecting the first fabric switch of the fabric switch pair to the second fabric switch of the fabric switch pair;

determining failure of at least one of the first fabric switch, the first computer system, the second fabric switch, and the second computer system;

when the first fabric switch or the first computer system fails, supporting the request based at least upon the second fabric switch of the fabric switch pair and the second computer system; and when the second fabric switch or the second computer system fails, supporting the request based at least upon the first fabric switch and the first computer system.

14. The system of claim 13, wherein the chassis ID is a combination of at least a MAC (Media Access Control) address, or a UUID (Universally Unique Identifier) of an Ethernet interface of a corresponding fabric switch.

15. The system of claim 14, wherein the instructions, when executed by the processor, cause the system to perform operations further comprising:

causing each fabric switch of the fabric switch pair to exchange each other's UUIDs or MAC addresses; and associating the fabric switch pair with an inter-link, the inter-link connecting the first fabric switch of the fabric switch pair to the second fabric switch of the fabric switch pair.

16. The system of claim 13, wherein the instructions, when executed by the processor, cause the system to perform operations further comprising:

determining that the first computer system fails or the first fabric switch fails; and supporting the request based at least upon the second fabric switch of the fabric switch pair, and the second computer system.

17. The computer-implemented method of claim 1, wherein the chassis ID comprises a MAC (Media Access Control) address or a UUID (Universally Unique Identifier) of an Ethernet interface of at least one fabric switch of fabric switch pair.

18. The computer-implemented method of claim 7, wherein the chassis ID comprises a MAC (Media Access Control) address or a UUID (Universally Unique Identifier) of an Ethernet interface of at least one fabric switch of fabric switch pair.

19. The system of claim 13, wherein the chassis ID comprises a MAC (Media Access Control) address or a UUID (Universally Unique Identifier) of an Ethernet interface of at least one fabric switch of fabric switch pair.

20. The system of claim 13, wherein the at least one drive is connected to a first port of the first fabric switch of the fabric switch pair using a first Serial Attached SCSI (SAS) interface or a first Peripheral Component Interconnect Express (PCIe) interface, and wherein the at least one drive is connected to a second port of the second fabric switch of the fabric switch pair using a second Serial Attached SCSI (SAS) interface or a second Peripheral Component Interconnect Express (PCIe) interface, the first port and the second port having a same port number.

* * * * *